United States Patent
Peringassery Krishnan et al.

(10) Patent No.: US 12,432,348 B2
(45) Date of Patent: Sep. 30, 2025

(54) METHOD AND APPARATUS FOR ADAPTIVE MULTI-HYPOTHESIS PROBABILITY MODEL FOR ARITHMETIC CODING

(71) Applicant: TENCENT AMERICA LLC, Palo Alto, CA (US)

(72) Inventors: Madhu Peringassery Krishnan, Mountain View, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/053,494

(22) Filed: Nov. 8, 2022

(65) Prior Publication Data

US 2023/0291905 A1     Sep. 14, 2023

Related U.S. Application Data

(60) Provisional application No. 63/318,588, filed on Mar. 10, 2022.

(51) Int. Cl.
| | | |
|---|---|---|
| *H04N 19/13* | (2014.01) | |
| *H04N 19/105* | (2014.01) | |
| *H04N 19/107* | (2014.01) | |
| *H04N 19/159* | (2014.01) | |
| *H04N 19/172* | (2014.01) | |

(Continued)

(52) U.S. Cl.
CPC ........... *H04N 19/13* (2014.11); *H04N 19/105* (2014.11); *H04N 19/107* (2014.11);
(Continued)

(58) Field of Classification Search
CPC .... H04N 19/13; H04N 19/105; H04N 19/107; H04N 19/159; H04N 19/172;
(Continued)

(56) References Cited

U.S. PATENT DOCUMENTS

| | | | |
|---|---|---|---|
| 11,330,289 B2 * | 5/2022 | Liu | ........................ H04N 19/184 |
| 11,876,993 B2 * | 1/2024 | Liu | ......................... H04N 19/52 |

(Continued)

OTHER PUBLICATIONS

International Search Report dated Mar. 21, 2023 from the International Searching authority in International application No. PCT/US2022/049386.

(Continued)

*Primary Examiner* — Dramos Kalapodas
(74) *Attorney, Agent, or Firm* — Sughrue Mion, PLLC

(57) ABSTRACT

A method performed by at least one processor of a video decoder includes receiving a coded video bitstream including at least one picture and one or more syntax elements encoded in accordance with multi-hypothesis arithmetic coding. The method further includes decoding each syntax element from the one or more syntax elements based on the multi-hypothesis arithmetic coding. The method further includes selecting a probability update rate from a plurality of probability update rates based on a predetermined condition, the plurality of probability update rates including a first probability update rate that is higher than a second probability update rate. The method further includes updating at least one probability model utilized in the multi-hypothesis arithmetic coding based on the selected probability update rate. The method further includes decoding at least one block in the at least one picture based on the decoded one or more syntax elements.

17 Claims, 7 Drawing Sheets

(51) Int. Cl.
　　　*H04N 19/176* (2014.01)
　　　*H04N 19/50* (2014.01)
　　　*H04N 19/70* (2014.01)
(52) U.S. Cl.
　　　CPC ......... *H04N 19/159* (2014.11); *H04N 19/172* (2014.11); *H04N 19/176* (2014.11); *H04N 19/50* (2014.11); *H04N 19/70* (2014.11)
(58) Field of Classification Search
　　　CPC ...... H04N 19/176; H04N 19/50; H04N 19/70; H04N 19/91
　　　See application file for complete search history.

(56) References Cited

U.S. PATENT DOCUMENTS

| | | | | |
|---|---|---|---|---|
| 2018/0192053 | A1* | 7/2018 | Zhou | H04N 19/13 |
| 2018/0376155 | A1* | 12/2018 | Yamamoto | H04N 19/96 |
| 2019/0222835 | A1 | 7/2019 | Panusopone et al. | |
| 2020/0344480 | A1* | 10/2020 | Zakharchenko | H04N 19/13 |
| 2021/0211707 | A1* | 7/2021 | Liu | H04N 19/184 |
| 2021/0227222 | A1 | 7/2021 | Lee et al. | |
| 2023/0254511 | A1* | 8/2023 | Zhao | H04N 19/70 |

OTHER PUBLICATIONS

Written Opinion dated Mar. 21, 2023 from the International Searching authority in International application No. PCT/US2022/049386.
Heiko Schwarz et al., "Quantization and Entropy Coding in the Versatile Video Coding (VVC) Standard", Submitted to IEEE Transactions on Circuits and Systems for Video Technology, Aug. 2020, pp. 1-16.
Alexander Alshin et al., "High Precision Probability Estimation for Cabac", Samsung Electronics, DMC Research Center, Abstract, pp. 1-6.

* cited by examiner

METHOD AND APPARATUS FOR ADAPTIVE MULTI-HYPOTHESIS PROBABILITY MODEL FOR ARITHMETIC CODING

CROSS-REFERENCE TO RELATED APPLICATION

This application is based on and claims priority to U.S. Provisional Patent Application No. 63/318,588, filed on Mar. 10, 2022, the disclosure of which is incorporated by reference herein in its entirety.

TECHNICAL FIELD

The present disclosure relates generally to communication systems, and more particularly to methods and apparatuses for adaptive multi-hypothesis probability model for arithmetic coding.

BACKGROUND

AOMedia Video 1 (AV1) is an open video coding format designed for video transmissions over the Internet. This coding format was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec. The current coding standards for multi-hypothesis probability models do not adequately take into account other information such as frame type, block size, prediction mode, etc.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for performing adaptive multi-hypothesis probability modeling for arithmetic coding are disclosed by the present disclosure.

According to an exemplary embodiment, a method performed by at least one processor of a video decoder includes receiving a coded video bitstream including at least one picture and one or more syntax elements encoded in accordance with multi-hypothesis arithmetic coding. The method further includes decoding each syntax element from the one or more syntax elements based on the multi-hypothesis arithmetic coding. The method further includes selecting a probability update rate from a plurality of probability update rates based on a predetermined condition, the plurality of probability update rates including a first probability update rate that is higher than a second probability update rate. The method further includes updating at least one probability model utilized in the multi-hypothesis arithmetic coding based on the selected probability update rate. The method further includes decoding at least one block in the at least one picture based on the decoded one or more syntax elements.

According to an exemplary embodiment, a video decoder includes at least one memory configured to store computer program code and at least one processor configured to access the computer program code and operate as instructed by the computer program code. The computer program code includes receiving code configured to cause the at least one processor to receive a coded video bitstream including at least one picture and one or more syntax elements encoded in accordance with multi-hypothesis arithmetic coding. The computer program code further includes first decoding code configured to cause the at least one processor to decode each syntax element from the one or more syntax elements based on the multi-hypothesis arithmetic coding. The computer program code further includes selecting code configured to cause the at least one processor to select a probability update rate from a plurality of probability update rates based on a predetermined condition, the plurality of probability update rates including a first probability update rate that is higher than a second probability update rate. The computer program code further includes updating code configured to cause the at least one processor to update at least one probability model utilized in the multi-hypothesis arithmetic coding based on the selected probability update rate. The computer program code further includes second decoding code configured to cause the at least one processor to decode at least one block in the at least one picture based on the decoded one or more syntax elements.

According to an exemplary embodiment, a non-transitory computer readable medium having instructions stored therein, which when executed by a processor in a video decoder cause the processor to execute a method that includes receiving a coded video bitstream including at least one picture and one or more syntax elements encoded in accordance with multi-hypothesis arithmetic coding. The method further includes decoding each syntax element from the one or more syntax elements based on the multi-hypothesis arithmetic coding. The method further includes selecting a probability update rate from a plurality of probability update rates based on a predetermined condition, the plurality of probability update rates including a first probability update rate that is higher than a second probability update rate. The method further includes updating at least one probability model utilized in the multi-hypothesis arithmetic coding based on the selected probability update rate. The method further includes decoding at least one block in the at least one picture based on the decoded one or more syntax elements.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
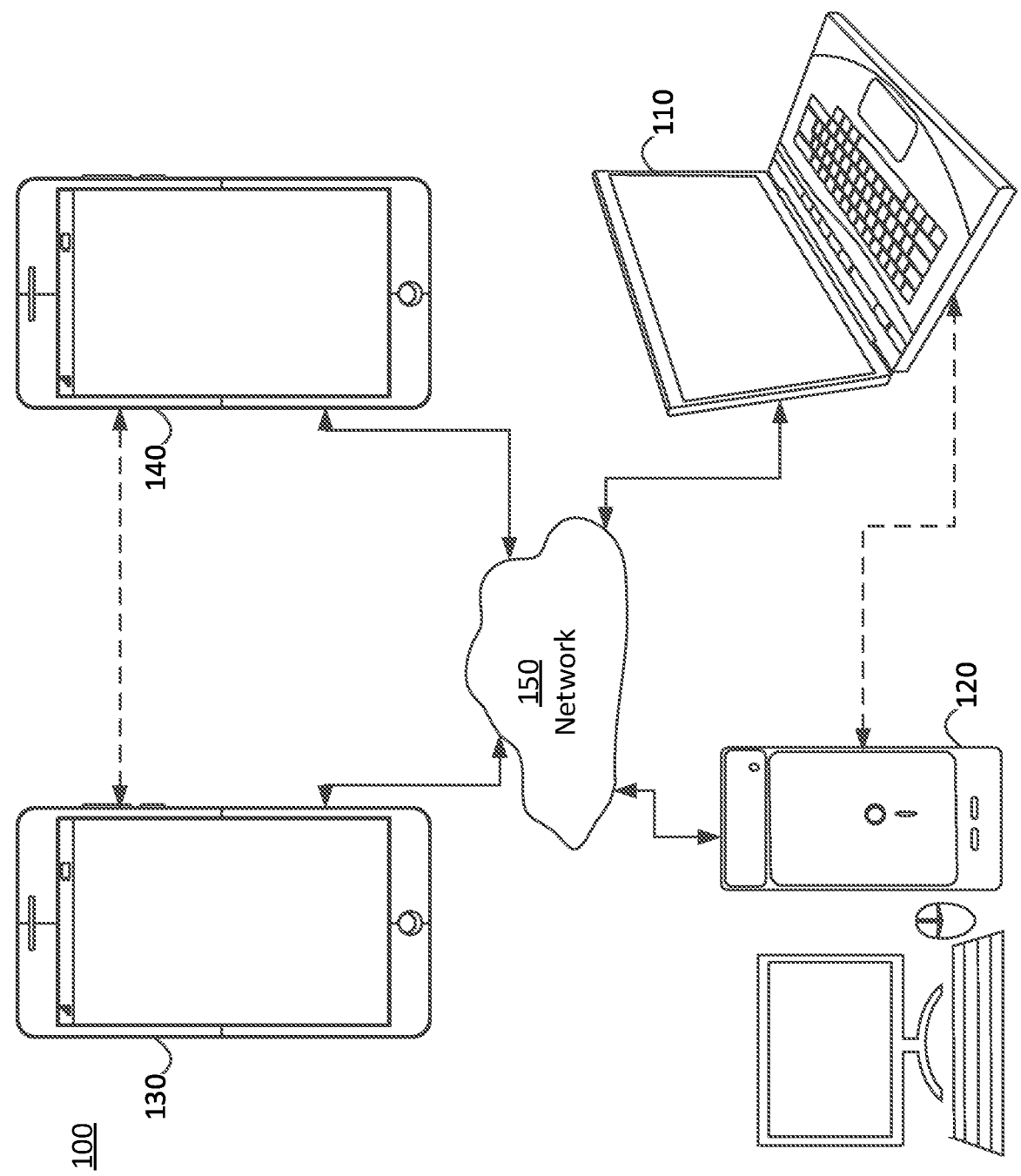
FIG. 1 is a schematic illustration of a block diagram of a communication system, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
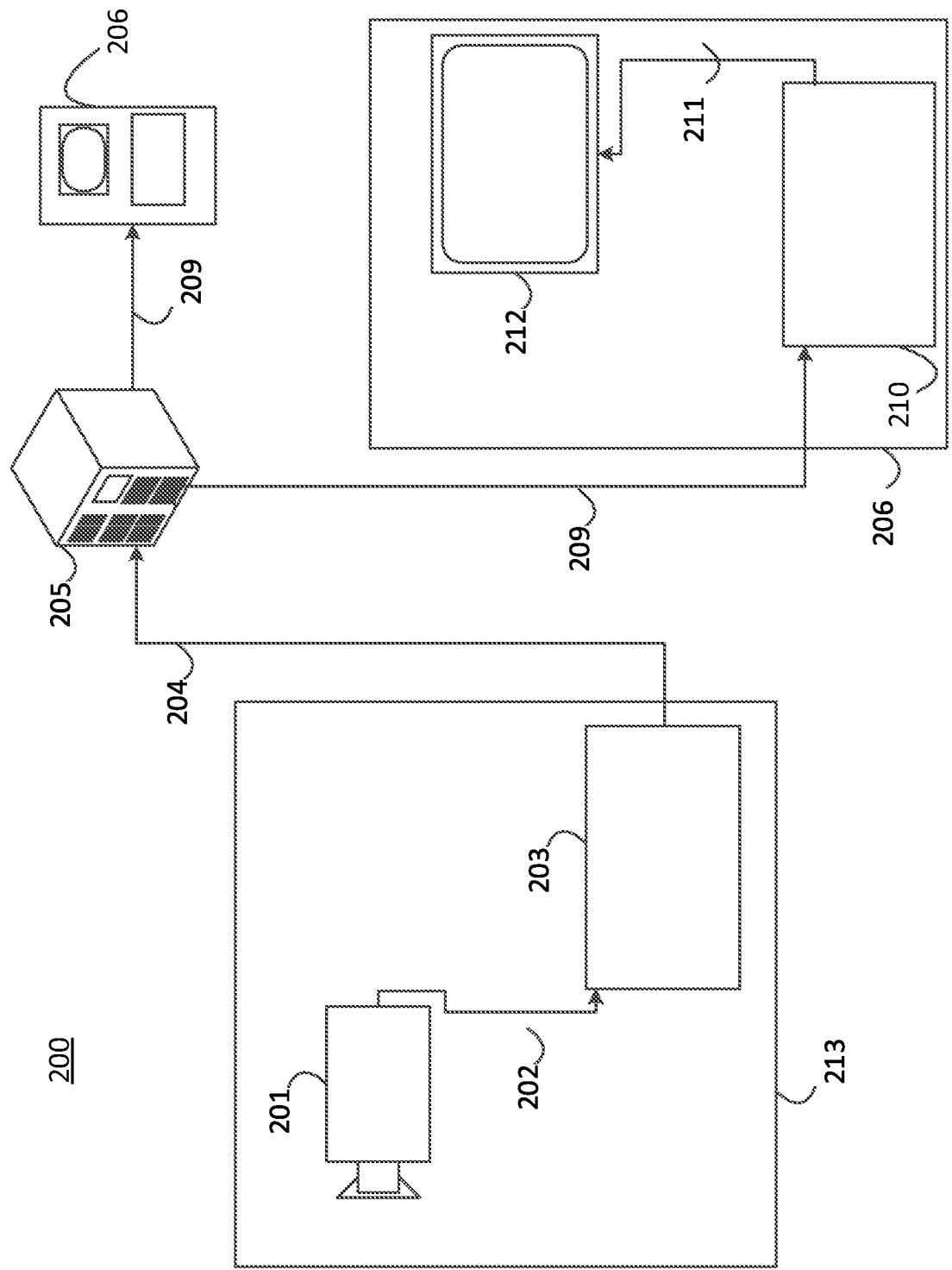
FIG. 2 is a schematic illustration of a block diagram of a communication system, in accordance with various embodiments of the present disclosure.

FIG. 2 illustrates, as an example for an application for the disclosed subject matter, the placement of a video encoder and decoder in a streaming environment. The disclosed subject matter may be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that may include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and may be processed by the encoder (203) coupled to the camera (201). The encoder (203) may include hardware, software, or a combination thereof to enable or implement aspects of the disclosed subject matter as described in more detail below. The encoded video bitstream (204) may include a lower data volume when compared to the sample stream, and may be stored on a streaming server (205) for future use. One or more streaming clients (206) may access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) may include a video decoder (210) and a display (212). The video decoder (210) can, for example, decode video bitstream (209), which is an incoming copy of the encoded video bitstream (204), and create an outgoing video sample stream (211) that may be rendered on the display (212) or another rendering device (not depicted). In some streaming systems, the video bitstreams (204, 209) may be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
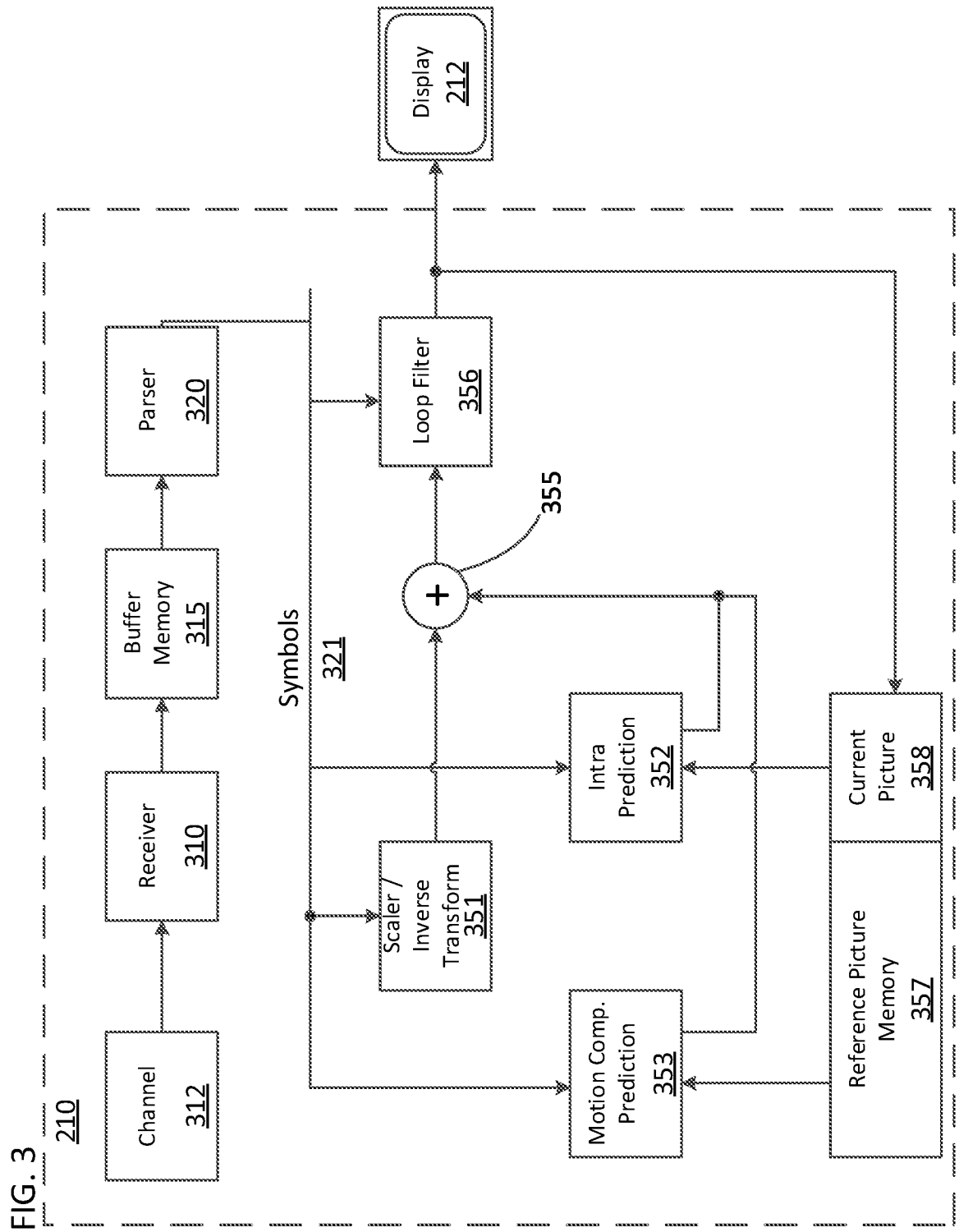
FIG. 3 is a schematic illustration of a block diagram of a decoder, in accordance with various embodiments of the present disclosure.

FIG. 3 illustrates an example functional block diagram of a video decoder (210) that is attached to a display (212) according to an embodiment of the present disclosure. The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or may be small. For use on best effort packet networks such as the Internet, the buffer (315) may be required, may be comparatively large, and may be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence may be in accordance with a video coding technology or standard, and may follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups may include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321). Reconstruction of the symbols (321) may involve multiple different units depending on the type of the coded video picture or parts thereof (such as: inter and intra picture, inter and intra block), and other factors. Which units are involved, and how they are involved, may be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) may be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) may output blocks including sample values that may be input into the aggregator (355).

In some cases, the output samples of the scaler/inverse transform (351) may pertain to an intra coded block; that is: a block that is not using predictive information from previously reconstructed pictures, but may use predictive information from previously reconstructed parts of the current picture. Such predictive information may be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) may pertain to an inter coded, and potentially motion compensated block. In such a case, a Motion Compensation Prediction unit (353) may access reference picture memory (357) to fetch samples used for prediction. After motion compensating the fetched samples in accordance with the symbols (321) pertaining to the block, these samples may be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, may be controlled by motion vectors. The motion vectors may be available to the Motion Compensation Prediction unit (353) in the form of symbols (321) that may have, for example, X, Y, and reference picture components. Motion compensation also may include interpolation of sample values as fetched from the reference picture memory (357) when sub-sample exact motion vectors are in use, motion vector prediction mechanisms, and so forth.

The output samples of the aggregator (355) may be subject to various loop filtering techniques in the loop filter unit (356). Video compression technologies may include in-loop filter technologies that are controlled by parameters included in the coded video bitstream and made available to the loop filter unit (356) as symbols (321) from the parser (320), but may also be responsive to meta-information obtained during the decoding of previous (in decoding order) parts of the coded picture or coded video sequence, as well as responsive to previously reconstructed and loop-filtered sample values.

The output of the loop filter unit (356) may be a sample stream that may be output to a render device such as a display (212), as well as stored in the reference picture memory (357) for use in future inter-picture prediction.

Certain coded pictures, once fully reconstructed, may be used as reference pictures for future prediction. Once a coded picture is fully reconstructed and the coded picture has been identified as a reference picture (by, for example, parser (320)), the current reference picture may become part of the reference picture memory (357), and a fresh current picture memory may be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data may be in the form of, for example, temporal, spatial, or SNR enhancement layers, redundant slices, redundant pictures, forward error correction codes, and so on.

Figure 4:
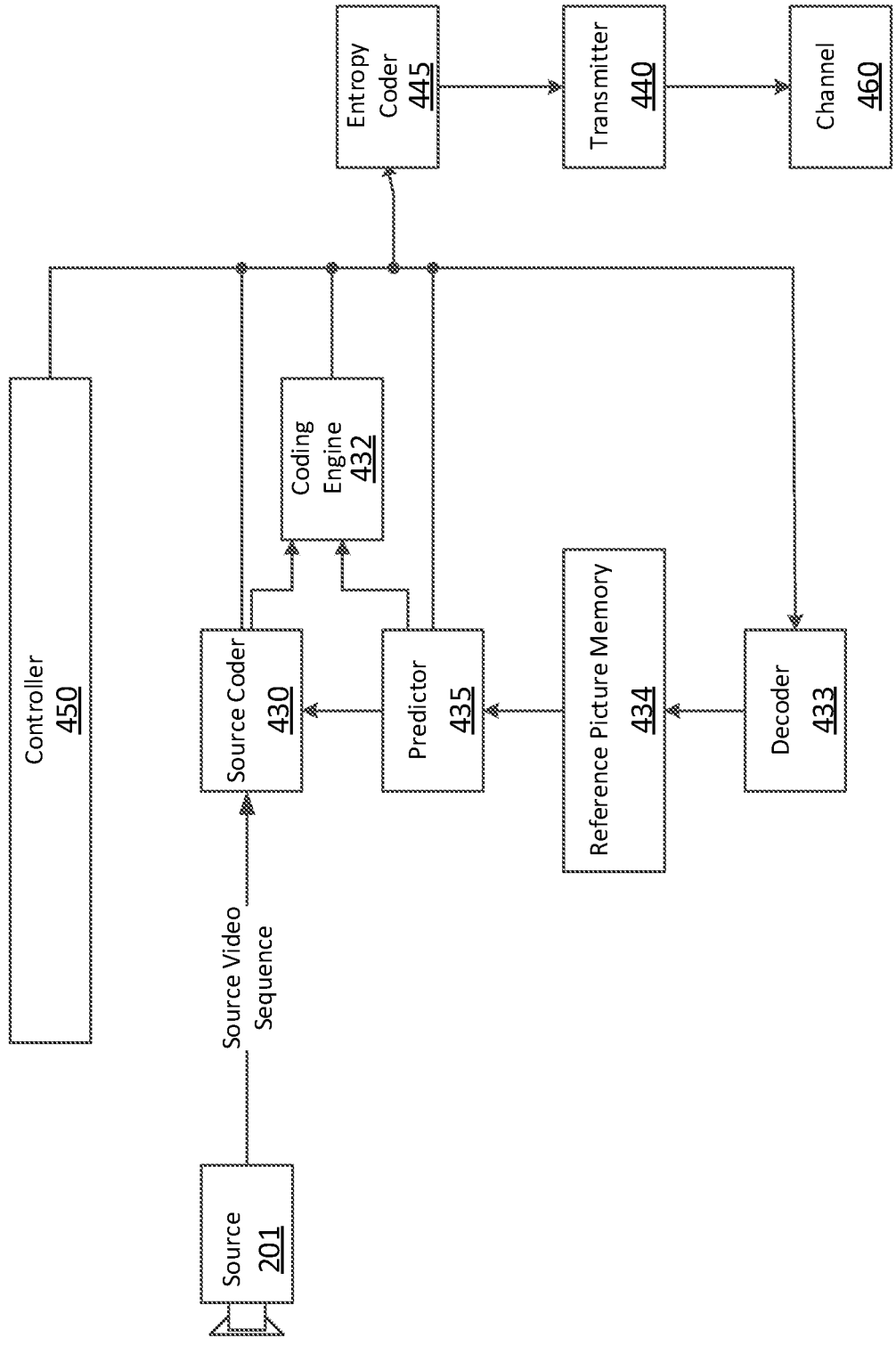
FIG. 4 is a block diagram of an encoder, in accordance with various embodiments of the present disclosure.

FIG. 4 illustrates an example functional block diagram of a video encoder (203) associated with a video source (201) according to an embodiment of the present disclosure. The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203). The video source (201) may provide the source video sequence to be coded by the encoder (203) in the form of a digital video sample stream that may be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel may include one or more sample depending on the sampling structure, color space, etc. in use. A person skilled in the art may readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) may include rate control related parameters (picture skip, quantizer, lambda value of rate-distortion optimization techniques, . . . ), picture size, group of pictures (GOP) layout, maximum motion vector search range, and so forth. A person skilled in the art may readily identify other functions of controller (450) as they may pertain to video encoder (203) optimized for a certain system design.

Some video encoders operate in what a person skilled in the are readily recognizes as a "coding loop". As an over-simplified description, a coding loop may consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) may be the same as of a "remote" decoder (210), which has already been described in detail above in conjunction with FIG. 3. However, as symbols are available and en/decoding of symbols to a coded video sequence by the entropy coder (445) and the parser (320) may be lossless, the entropy decoding parts of decoder (210), including channel (312), receiver (310), buffer (315), and parser (320) may not be fully implemented in the local decoder (433).

An observation that may be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies may be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data. Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown). The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures may use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of embodiments of the disclosure in more detail, a few terms are introduced below that are referred to in the remainder of this description.

"Sub-Picture" henceforth refers to, in some cases, a rectangular arrangement of samples, blocks, macroblocks, coding units, or similar entities that are semantically grouped, and that may be independently coded in changed resolution. One or more sub-pictures may form a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

"Adaptive Resolution Change" (ARC) henceforth refers to mechanisms that allow the change of resolution of a picture or sub-picture within a coded video sequence, by the means of, for example, reference picture resampling. "ARC parameters" henceforth refer to the control information required to perform adaptive resolution change, that may include, for example, filter parameters, scaling factors, resolutions of output and/or reference pictures, various control flags, and so forth.

A context-adaptive arithmetic coding (CABAC) engine in HEVC and VVC may use a table-based probability transition process between 64 different representative probability states. In HEVC, the range ivlCurrRange representing the state of the coding engine may be quantized to a set of 4 values prior to the calculation of the new interval range. The HEVC state transition may be implemented using a table containing all 64×4 8-bit pre-computed values to approximate the values of ivlCurrRange*pLPS(pStateIdx), where pLPS is the probability of the least probable symbol (LPS) and pStateIdx is the index of the current state. A decode decision may be implemented using the pre-computed LUT. First ivlLpsRange may be obtained using the LUT as follows. Then, ivlLpsRange may be used to update ivlCurrRange and calculate the output binVal.

$$\text{ivlLpsRange} = \text{rangeTabLps}[\text{pStateIdx}][\text{qRangeIdx}] \quad \text{Eq. (1)}$$

In VVC, the probability may be linearly expressed by the probability index pStateIdx. Therefore, all the calculations may be performed with equations without the LUT operation. To improve the accuracy of probability estimation, a multi-hypothesis probability update model may be applied. The pStateIdx used in the interval subdivision in the binary arithmetic coder may be a combination of two probabilities: pStateIdx0 and pStateIdx1. The two probabilities may be associated with each context model and may be updated independently with different adaptation rates. The adaptation rates of pStateIdx0 and pStateIdx1 for each context model may be pre-trained based on the statistics of the associated bins. The probability estimate pStateIdx may be the average of the estimates from the two hypotheses.

Figure 5:
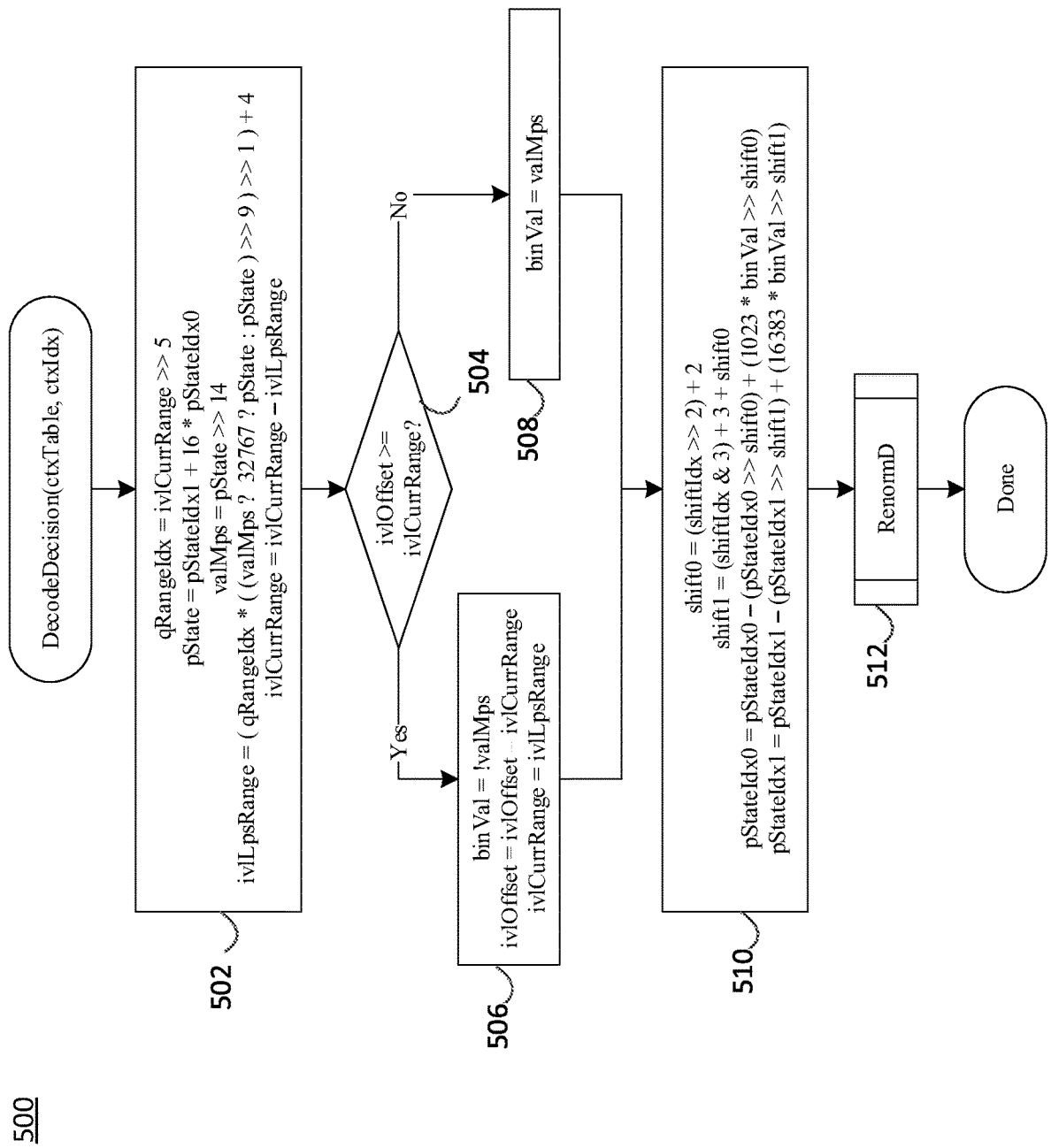
FIG. 5 illustrates an example flow chart of a process for decoding a bin, in accordance with various embodiments of the present disclosure.

FIG. 5 illustrates an embodiment of a process (500) for decoding a single binary decision. The process (500) may start at operation (502) to determine a value for the variable ivlCurrRange. At operation (504), if the variable ivlCurrRange is less than or equal to the variable ivlOffset, the process proceeds to operation (506) to update the values of the variables binVal, ivlOffset, and ivlCurrRange. If the variable ivlCurrRange is not less than the value of the variable ivlOffset, the process proceeds to operation (508) to update the value of the variable binVal. The process proceeds from either operation (506) or operation (508) to operation (510) to update the variables pStateIdx0 and pStateIdx1. The process proceeds to operation (512) to perform the RenormD process.

As performed in HEVC, VVC CABAC may also have a QP dependent initialization process invoked at the beginning of each slice. Given the initial value of luma QP for the slice, the initial probability state of a context model, denoted as preCtxState, may be derived as follows:

$$m = \text{slopeIdx} \times 5 - 45 \quad \text{Eq. (2)}$$

$$n = (\text{offsetIdx} << 3) + 7 \quad \text{Eq. (3)}$$

$$\text{preCtxState} = \text{Clip3}(1, 127, ((m \times (QP - 32)) >> 4) + n), \quad \text{Eq. (4)}$$

where slopeIdx and offsetIdx may be restricted to 3 bits, and total initialization values may be represented by 6-bit precision. The probability state preCtxState represents the probability in the linear domain directly. Hence, preCtxState may only need proper shifting operations before input to arithmetic coding engine, and the logarithmic to the linear domain mapping as well as the 256-byte table is saved.

$$\text{pStateIdx0} = \text{preCtxState} << 3 \quad \text{Eq. (5)}$$

$$\text{pStateIdx1} = \text{preCtxState} << 7 \quad \text{Eq. (6)}$$

In AV1, an M-ary arithmetic coding engine may be used for entropy coding the syntax elements. Each syntax element may be associated with an alphabet of M elements, where M may be any integer value between 2 and 16. The input to the encoding may be an M-ary symbol, and a coding context that may include a set of M probabilities, represented by a cumulative distribution function (CDF). The probabilities may be updated after coding/parsing each syntax element. The probability update rate refers to a frequency at which the probability is updated after coding or parsing each respective syntax element. The cumulative distribution functions may be arrays of M 15-bit integers as follows:

$$C=[c_0, c_1, \ldots, c_{(M-2)}, 2^{15}], \quad \text{Eq. (7)}$$

where $c_n/32768$ is the probability of the symbol being less than or equal to n.

The probability update may be performed using the following equations:

$$\begin{cases} c_m = c_m \cdot (1-\alpha) & m \in [0, \text{symbol}) \\ c_m = c_m + \alpha \cdot (1-c_m) & m \in [\text{symbol}, M-1) \end{cases}, \quad \text{Eq. (8)}$$

where $\alpha$ is the probability update rate that adapts based on the number of times the symbol has been decoded (up to a maximum of 32) and m is the index of the element in the CDF. This adaptation of $\alpha$ allows faster probability updates at the beginning of coding/parsing the syntax elements. The M-ary arithmetic coding process may follow the conventional arithmetic coding engine design. However, only the most significant 9 bits of the 15-bit probability values may be input to the arithmetic encoder/decoder. The probability update rate $\alpha$ associated with a symbol may be calculated based on the number of appearances for the associated symbol when parsing a bitstream, and the value of $\alpha$ may be reset using the following formula at the beginning of a frame or a tile:

$$\alpha = \frac{1}{2^{3+(count>15)+(count>32)+min(log_2(M),2)}} \quad \text{Eq. (9)}$$

From the above equation, the probability update rate has a greater value at the beginning and then saturates after 32 appearances happened.

A multi-hypothesis probability model for encoding an M-ary symbol may including modifications to the AV1 arithmetic coding engine regarding multi-hypothesis estimation and regularization.

In multi-hypothesis estimation, AV1 may use a data adaptive model for probability update, where the update rate is higher with fewer occurrence of a syntax element and is lower with more observations. However, only a single probability model is used by the engine. Multiple studies have shown that a multi-hypothesis estimation, where each syntax element maintains two or more probability tables of different update rates, may bring additional compression efficiency. Thus, a multi-hypothesis probability model may be implemented with two update rates:

$$\alpha_1 = \frac{1}{2^{4+(count>15)+(count>31)+min(log_2(M),2)}}, \quad \text{Eq. (10)}$$

$$\alpha_2 = \frac{1}{2^{2+(count>7)+(count>15)+min(log_2(M),2)}}, \quad \text{Eq. (11)}$$

where $\alpha_2$ models a faster update while $\alpha_1$ a slower update. The final probability model may be calculated as a linear combination of the hypotheses. Currently, the average of two hypotheses is used.

In regularization, the faster update rate $\alpha_2$ may lead to a strongly biased distribution with certain symbol probabilities reducing close to zero. Probabilities close to zero may result in BDRATE losses. To counter this effect, a regularization approach is used, where at the end of each probability update, if the probability ($p_m$) is less than a threshold ($P_{min}$), a regularization term may be applied to all probabilities so that $p_m$ is moved to $P_{min}$. The regularization term may be taken from a uniform distribution, and may depend on the sample space of the syntax element.

The proposed design of multi-hypothesis probability model for the arithmetic coding engine uses an average of two hypothesis to update the probability for all contexts. However, conventional multi-hypothesis probability modeling is agnostic to the frame type (keyframe, inter frame, intra only frame etc.), coded block size, coded block prediction mode information, etc. For different syntax, the optimal design of probability update model may utilize this prior information to adapt the arithmetic coding engine faster to current symbol statistics and thereby improving coding performance.

Embodiments of the present disclosure are directed to a set of advanced video coding technologies including an adaptive multi-hypothesis probability model for arithmetic coding. The embodiments of the present disclosure may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit (i.e., CU). The term block here may also be used to refer to the transform block. In the following items, when saying block size, it may refer to either the block width or height, or maximum value of width and height, or minimum of width and height, or area size (width*height), or aspect ratio (width:height, or height:width) of the block.

The embodiments of the present disclosure may also apply on a basis of slice or tiles. For example, when a following method applies for a frame type, the same method may be also applied to a slice type and/or tile type. In some embodiments, reference to a faster update rate may refer to a bigger value of update rate, or a smaller probability update window size.

In some embodiments, a probability update rate used to update the probability model for syntax elements may depend on a frame type of a current picture under reconstruction. In some embodiments, keyframes and/or intra only frames use a different update rate compared to the update rate used for other frame types. For example, keyframes and/or intra only frames may use a faster update rate (e.g, $\alpha_2$) for all or selected syntax elements. In some embodiments, inter frames may use a slower update rate (e.g, $\alpha_1$) for all or selected syntax elements.

In some embodiments, when the final probability model is calculated as a linear combination of two or more hypotheses with update rates $\alpha_1, \alpha_2, \alpha_3, \ldots \alpha_n$, weights $w_1, w_2, w_3, \ldots w_n$, etc. may be used for the linear combination. For example, the probability hypotheses may be derived as $p_1, p_2, p_3, \ldots p_n$ using update rates $\alpha_1, \alpha_2, \alpha_3, \ldots \alpha_n$, where the final probability update is derived as the weighted sum: $\Sigma_{i=1}^{n} p_i \cdot w_i$. In some embodiments, the weights used may depend on the frame type. For example, a keyframe and/or intra only frame may use larger weights $w_n$ if $\alpha_n$ corresponds to a faster update rate. Similarly, for inter frames, larger weights may be utilized for slower update rates.

In some embodiments, the probability update rate used to update the probability model for syntax elements may depend on the coded block size. As an example, for smaller block sizes a faster update rate (e.g, $\alpha_2$) may be used for all syntax elements. For example, 4×4, 4×8, 8×4, 8×8, etc.

blocks may use a faster update rate for its syntax elements. In another example, for larger block sizes a smaller update rate (e.g, $\alpha_2$) may be used for all syntax elements. For example, blocks of size 16×16 to 256×256, etc. may use a faster update rate for the syntax elements if these blocks.

In some embodiments, when the final probability model is calculated as a linear combination of two or more hypotheses with update rates $\alpha_1, \alpha_2, \alpha_3, \ldots \alpha_n$, etc., weights $w_1$, $w_2, w_3, \ldots w_n$, etc. may be used for the linear combination. For example, the weights used depend on block size. In some embodiments, a smaller block may use larger weights $w_n$ if $\alpha_n$ corresponds to a faster update rate. Similarly, for larger blocks, larger weights may be utilized for slower update rates.

In some embodiments, a probability update rate used to update the probability model for syntax elements may depend on the prediction mode information of a coded block. As an example, for intra predicted blocks, a faster update rate (e.g, $\alpha_2$) may be used for all or selected syntax elements. In another example, for inter predicted blocks, a smaller update rate (e.g, $\alpha_2$) may be used for all or selected syntax elements.

In some embodiments, when the final probability model is calculated as a linear combination of two or more hypotheses with update rates $\alpha_1, \alpha_2, \alpha_3, \ldots \alpha_n$, etc., weights $w_1$, $w_2, w_3, \ldots w_n$, etc. may be used for the linear combination. For example, the probability hypotheses may be derived as $p_1, p_2, p_3, \ldots p_n$ using update rates $\alpha_1, \alpha_2, \alpha_3, \ldots \alpha_n$, where the final probability update may be derived as the weighted sum: $\Sigma_{i=1}^{n} p_i \cdot w_1$. In some embodiments, the weights used may depend on a prediction mode. For example, intra predicted blocks may use larger weights $w_n$ if $\alpha_n$ corresponds to a faster update rate. Similarly, for inter predicted blocks, larger weights may be utilized for slower update rates.

In some embodiments, the probability update rate used to update the probability model for syntax elements may depend on other coded information, including, but not limited to quantization step size, QP, temporal layer, frame resolution, content type (e.g., whether screen content coding tools are used). In some embodiments, the probability update rate used to update the probability model for syntax elements is specified in high-level syntax, including, but not limited to VPS, PPS, APS, SPS, picture header, slice header, tile header, CTU (or superblock) header.

Figure 6:
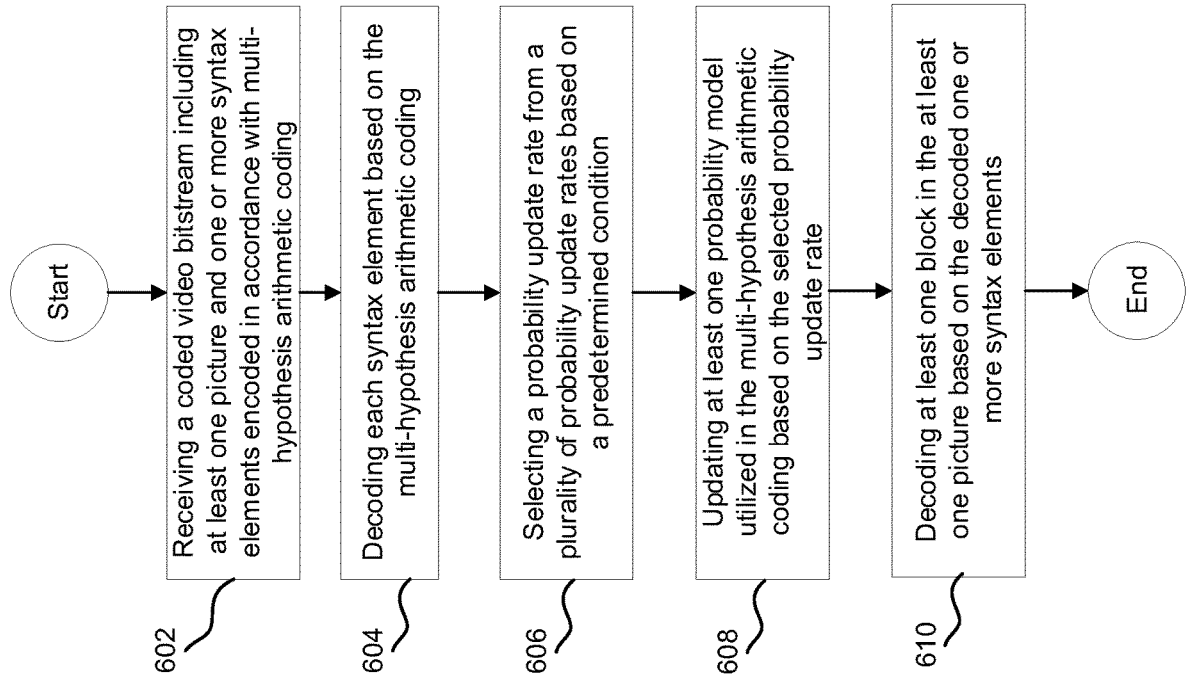
FIG. 6 illustrates an example flow chart of a process for performing adaptive multi-hypothesis probability modeling for arithmetic coding.

FIG. 6 illustrates an example flow chart of a process (600) for performing adaptive multi-hypothesis probability modeling for arithmetic coding. The process (600) may be performed by a decoder such as decoder (210). The process may start at operation (602) where a coded video bitstream is received. The bitstream may include at least one picture and one or more syntax elements encoded in accordance with multi-hypothesis arithmetic coding. The process proceeds to operation (604) where each syntax element is decoded based on the multi-hypothesis arithmetic coding.

The process proceeds to operation (606) where a probability update rate from a plurality of probability update rates is selected based on a predetermined condition. For example, the predetermined condition may specify a frame type of the at least one picture in the bitstream, where the probability update rate is selected based on whether the frame type is a keyframe, intra frame, or inter frame. As another example, the predetermined condition may specify a block size of at least one block in the picture. As another example, the predetermined condition may specify a prediction mode of the at least one block.

The process proceeds to operation (608) where at least one probability model utilized in the multi-hypothesis arithmetic coding is updated based on the selected probability update rate. The process proceeds to operation (610) where at least one block in the at least one picture is decoded based on the decoded one or more syntax elements.

The techniques of embodiments of the present disclosure described above, may be implemented as computer software using computer-readable instructions and physically stored in one or more computer-readable media. For example, FIG. 7 shows a computer system (700) suitable for implementing embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 7:
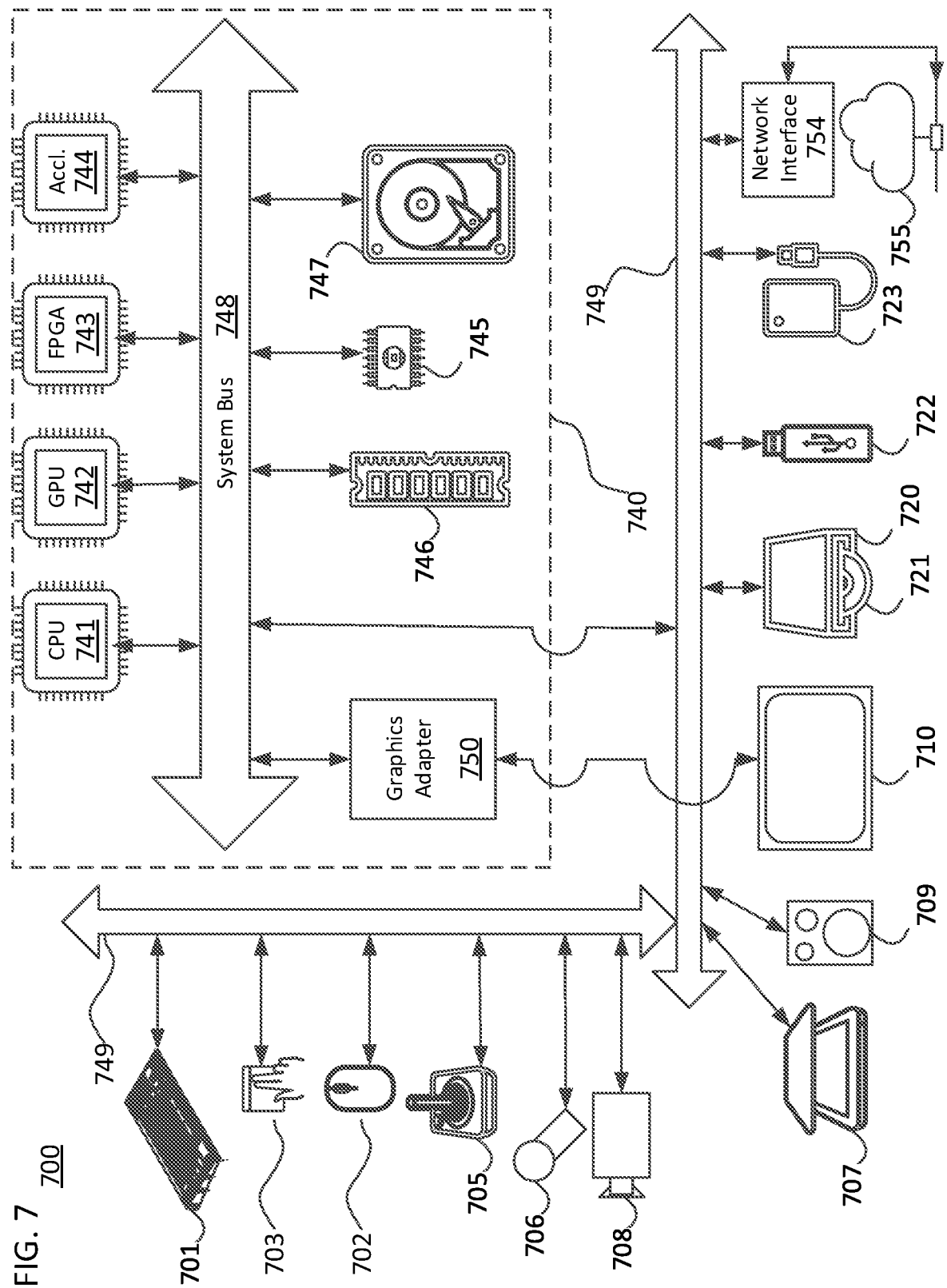
FIG. 7 is a diagram of a computer system, in accordance with various embodiments of the present disclosure.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove, joystick (705), microphone (706), scanner (707), and camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove, or joystick (705), but there may also be tactile feedback devices that do not serve as input devices). For example, such devices may be audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) may also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700); others are commonly integrated into the core of the computer system (700) by attachment to a system bus as described below (for example Ethernet interface into a PC computer system or cellular network interface into a smartphone computer system). Using any of these networks, computer system (700) may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment (755). Certain protocols and protocol stacks may be used on each of those networks and network interfaces as described above.

Aforementioned human interface devices, human-accessible storage devices, and network interfaces (754) may be attached to a core (740) of the computer system (700).

The core (740) may include one or more Central Processing Units (CPU) (741), Graphics Processing Units (GPU) (742), specialized programmable processing units in the form of Field Programmable Gate Areas (FPGA) (743), hardware accelerators (744) for certain tasks, and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) may be accessible in the form of one or more physical plugs to enable extensions by additional CPUs, GPU, and the like. The peripheral devices may be attached either directly to the core's system bus (748), or through a peripheral bus (749). Architectures for a peripheral bus include PCI, USB, and the like. A graphics adapter (750) may be included in the core (740).

CPUs (741), GPUs (742), FPGAs (743), and accelerators (744) may execute certain instructions that, in combination, may make up the aforementioned computer code. That computer code may be stored in ROM (745) or RAM (746). Transitional data may be also be stored in RAM (746), whereas permanent data may be stored for example, in the internal mass storage (747). Fast storage and retrieve to any of the memory devices may be enabled through the use of cache memory, that may be closely associated with one or more CPU (741), GPU (742), mass storage (747), ROM (745), RAM (746), and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture (700), and specifically the core (740) may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core (740) that are of non-transitory nature, such as core-internal mass storage (747) or ROM (745). The software implementing various embodiments of the present disclosure may be stored in such devices and executed by core (740). A computer-readable medium may include one or more memory devices or chips, according to particular needs. The software may cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system may provide functionality as a result of logic hardwired or otherwise embodied in a circuit (for example: accelerator (744)), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor of a video decoder, the method including: receiving a coded video bitstream including at least one picture and one or more syntax elements encoded in accordance with multi-hypothesis arithmetic coding; decoding each syntax element from the one or more syntax elements based on the multi-hypothesis arithmetic coding; selecting a probability update rate from a plurality of probability update rates based on a predetermined condition, the plurality of probability update rates including a first probability update rate that is higher than a second probability update rate; updating at least one probability model utilized in the multi-hypothesis arithmetic coding based on the selected probability update rate; and decoding at least one block in the at least one picture based on the decoded one or more syntax elements.

(2) The method according to feature (1), in which the predetermined condition specifies a frame type of the at least one picture.

(3) The method according to feature (2), in which the selecting comprises selecting the first probability update rate, in response to a determination that a frame type of the at least one picture is one of a keyframe and an intra frame.

(4) The method according to feature (2) or (3), in which the selecting comprises selecting the second probability update rate, in response to a determination that a frame type of the at least one picture is an inter frame.

(5) The method according to any one of features (2)-(4), in which the multi-hypothesis arithmetic coding includes a linear combination of a plurality of probability models, in which each probability model is derived using a corresponding probability update rate from the plurality of probability update rates, and in which the linear combination is a weighted sum using a plurality of weights, in which each weight depends on the frame type of the at least one picture.

(6) The method according to feature (5), in which in response to a determination the frame type is one of a keyframe and an intra frame, a larger weight is used compared to a determination the frame type is an interframe.

(7) The method according to any one of features (1)-(6), in which the predetermined condition specifies a block size of the at least one block.

(8) The method according to feature (7), in which in response to a determination that the at least one block is an N×M block, the first probability update rate is selected, in which N is one of 4 and 8, and in which M is one of 4 and 8.

(9) The method according to feature (7) or (8), in which in response to a determination that the at least one block is an N×M block, the second probability update rate is selected, in which N is 16 or greater and M is 16 or greater.

(10) The method according to any one of features (7)-(9), in which the multi-hypothesis arithmetic coding includes a linear combination of plurality of probability models, in which each probability model is derived using a corresponding probability update rate from the plurality of probability update rates, and in which the linear combination is a weighted sum using a plurality of weights, in which each weight depends on the block size of the at least one block.

(11) The method according to feature (10), in which a first weight from the plurality of weights for a first block is larger than a second weight from the plurality of weights for a second block, the first block being smaller than the second block.

(12) The method according to any one of features (2)-(11), in which the predetermined condition specifies a prediction mode of the at least one block.

(13) The method according to feature (12), in which in response to a determination the prediction mode of the at least one block is an intra predicted mode, the first probability update rate is selected.

(14) The method according to features (12) or (13), in which in response to a determination the prediction mode the at least one block is an inter predicted mode, the second probability update rate is selected.

(15) The method according to any one of features (12)-(14), in which the multi-hypothesis arithmetic coding includes a linear combination of a plurality of probability models, in which each probability model is derived using a corresponding probability update rate from the plurality of probability update rates, and in which the linear combination is a weighted sum using a plurality of weights, in which each weight depends on the prediction mode of the at least one block.

(16) The method according to feature (15), in which in response to a determination the prediction mode is an intra prediction mode, the weight is larger compared to a determination the prediction mode is an inter prediction mode.

(17) A video decoder including: at least one memory configured to store computer program code; and at least one processor configured to access the computer program code and operate as instructed by the computer program code, the computer program code including: receiving code configured to cause the at least one processor to receive a coded video bitstream including at least one picture and one or more syntax elements encoded in accordance with multi-hypothesis arithmetic coding, first decoding code configured to cause the at least one processor to decode each syntax element from the one or more syntax elements based on the multi-hypothesis arithmetic coding, selecting code configured to cause the at least one processor to select a probability update rate from a plurality of probability update rates based on a predetermined condition, the plurality of probability update rates including a first probability update rate that is higher than a second probability update rate, updating code configured to cause the at least one processor to update at least one probability model utilized in the multi-hypothesis arithmetic coding based on the selected probability update rate, and second decoding code configured to cause the at least one processor to decode at least one block in the at least one picture based on the decoded one or more syntax elements.

(18) The video decoder according to feature (17), in which the predetermined condition specifies a frame type of the at least one picture.

(19) The video decoder according to feature (18), in which the selecting code is further configured to cause the at least one processor to select the first probability update rate, in response to a determination that a frame type of the at least one picture is one of a keyframe and an intra frame.

(20) A non-transitory computer readable medium having instructions stored therein, which when executed by a processor in a video decoder cause the processor to execute a method including: receiving a coded video bitstream including at least one picture and one or more syntax elements encoded in accordance with multi-hypothesis arithmetic coding; decoding each syntax element from the one or more syntax elements based on the multi-hypothesis arithmetic coding; selecting a probability update rate from a plurality of probability update rates based on a predetermined condition, the plurality of probability update rates including a first probability update rate that is higher than a second probability update rate; updating at least one probability model utilized in the multi-hypothesis arithmetic coding based on the selected probability update rate; and decoding at least one block in the at least one picture based on the decoded one or more syntax elements.

What is claimed is:

1. A method performed by at least one processor of a video decoder, the method comprising:
  receiving a coded video bitstream including at least one picture and one or more syntax elements encoded in accordance with multi-hypothesis arithmetic coding;
  decoding each syntax element from the one or more syntax elements based on the multi-hypothesis arithmetic coding;
  selecting a probability update rate from a plurality of probability update rates based on a predetermined condition, the plurality of probability update rates including a first probability update rate that is higher than a second probability update rate, the predetermined condition comprising one or more of a frame type, a block size, a prediction mode, a quantization step size, a quantization parameter, a temporal layer identifier, a frame resolution, a content type, and a coding tool, wherein each probability update rate from the plurality of probability update rates indicates a frequency in which a probability is updated after each syntax element is decoded,
  wherein the first probability update rate is calculated in accordance with:

$$\alpha_1 = \frac{1}{2^{4+(count>15)+(count>31)+min(log_2(M),2)}},$$

wherein the second probability update rate is calculated in accordance with:

$$\alpha_2 = \frac{1}{2^{2+(count>7)+(count>15)+min(log_2(M),2)}},$$

wherein M is an integer number corresponding to an M-ary alphabet,
  wherein count corresponds to a number of times a symbol has been decoded;
  updating at least one probability model utilized in the multi-hypothesis arithmetic coding based on the selected probability update rate; and
  decoding at least one block in the at least one picture based on the decoded one or more syntax elements,
  wherein the multi-hypothesis arithmetic coding includes a linear combination of a plurality of probability models, wherein each probability model is derived using a corresponding probability update rate from the plurality of probability update rates, and
  wherein the linear combination is a weighted sum using a plurality of weights, wherein each weight depends on the frame type of the at least one picture.

2. The method according to claim 1, wherein the predetermined condition specifies the frame type of the at least one picture.

3. The method according to claim 2, wherein the selecting comprises selecting the first probability update rate, in response to a determination that a frame type of the at least one picture is one of a keyframe and an intra frame.

4. The method according to claim 2, wherein the selecting comprises selecting the second probability update rate, in response to a determination that a frame type of the at least one picture is an inter frame.

5. The method according to claim 1, wherein in response to a determination the frame type is one of a keyframe and an intra frame, a larger weight is used compared to a determination the frame type is an interframe.

6. The method according to claim 1, wherein the predetermined condition specifies a block size of the at least one block.

7. The method according to claim 6, wherein in response to a determination that the at least one block is an N×M block, the first probability update rate is selected, wherein N is one of 4 and 8, and wherein M is one of 4 and 8.

8. The method according to claim 6, wherein in response to a determination that the at least one block is an N×M block, the second probability update rate is selected, wherein N is 16 or greater and M is 16 or greater.

9. The method according to claim 1, wherein a first weight from the plurality of weights for a first block is larger than a second weight from the plurality of weights for a second block, wherein the first block has a first number of coefficients and the second block has a second number of coefficients, and wherein the first number of coefficients is less than the second number of coefficients.

10. The method according to claim 1, wherein the predetermined condition specifies a prediction mode of the at least one block.

11. The method according to claim 10, wherein in response to a determination the prediction mode of the at least one block is an intra predicted mode, the first probability update rate is selected.

12. The method according to claim 10, wherein in response to a determination the prediction mode the at least one block is an inter predicted mode, the second probability update rate is selected.

13. The method according to claim 10, wherein in response to a determination the prediction mode is an intra prediction mode, the weight is a first value and in response to a determination the prediction mode is an inter prediction mode, the weight is a second value less than the first value.

14. A video decoder comprising:
  at least one memory configured to store computer program code; and
  at least one processor configured to access the computer program code and operate as instructed by the computer program code, the computer program code including:
    receiving code configured to cause the at least one processor to receive a coded video bitstream including at least one picture and one or more syntax elements encoded in accordance with multi-hypothesis arithmetic coding, first decoding code configured to cause the at least one processor to decode each syntax element from the one or more syntax elements based on the multi-hypothesis arithmetic coding,
selecting code configured to cause the at least one processor to select a probability update rate from a plurality of probability update rates based on a predetermined condition, the plurality of probability update rates including a first probability update rate that is higher than a second probability update rate, the predetermined condition comprising one or more of a frame type, a block size, a prediction mode, a quantization step size, a quantization parameter, a temporal layer identifier, a frame resolution, a content type, and a coding tool, wherein each probability update rate from the plurality of probability update rates indicates a frequency in which a probability is updated after each syntax element is decoded,
wherein the first probability update rate is calculated in accordance with:

$$\alpha_1 = \frac{1}{2^{4+(count>15)+(count>31)+min(log_2(M),2)}},$$

wherein the second probability update rate is calculated in accordance with:

$$\alpha_2 = \frac{1}{2^{2+(count>7)+(count>15)+min(log_2(M),2)}},$$

wherein M is an integer number corresponding to an M-ary alphabet,
wherein count corresponds to a number of times a symbol has been decoded,
updating code configured to cause the at least one processor to update at least one probability model utilized in the multi-hypothesis arithmetic coding based on the selected probability update rate, and
second decoding code configured to cause the at least one processor to decode at least one block in the at least one picture based on the decoded one or more syntax elements,
wherein the multi-hypothesis arithmetic coding includes a linear combination of a plurality of probability models,
wherein each probability model is derived using a corresponding probability update rate from the plurality of probability update rates, and
wherein the linear combination is a weighted sum using a plurality of weights, wherein each weight depends on the frame type of the at least one picture.

15. The video decoder according to claim 14, wherein the predetermined condition specifies the frame type of the at least one picture.

16. The video decoder according to claim 15, wherein the selecting code is further configured to cause the at least one processor to select the first probability update rate, in response to a determination that a frame type of the at least one picture is one of a keyframe and an intra frame.

17. A non-transitory computer readable medium having instructions stored therein, which when executed by a processor in a video decoder cause the processor to execute a method comprising:
receiving a coded video bitstream including at least one picture and one or more syntax elements encoded in accordance with multi-hypothesis arithmetic coding;
decoding each syntax element from the one or more syntax elements based on the multi-hypothesis arithmetic coding;
selecting a probability update rate from a plurality of probability update rates based on a predetermined condition, the plurality of probability update rates including a first probability update rate that is higher than a second probability update rate, the predetermined condition comprising one or more of a frame type, a block size, a prediction mode, a quantization step size, a quantization parameter, a temporal layer identifier, a frame resolution, a content type, and a coding tool, wherein each probability update rate from the plurality of probability update rates indicates a frequency in which a probability is updated after each syntax element is decoded,
wherein the first probability update rate is calculated in accordance with:

$$\alpha_1 = \frac{1}{2^{4+(count>15)+(count>31)+min(log_2(M),2)}},$$

wherein the second probability update rate is calculated in accordance with:

$$\alpha_2 = \frac{1}{2^{2+(count>7)+(count>15)+min(log_2(M),2)}},$$

wherein M is an integer number corresponding to an M-ary alphabet,
wherein count corresponds to a number of times a symbol has been decoded;
updating at least one probability model utilized in the multi-hypothesis arithmetic coding based on the selected probability update rate; and
decoding at least one block in the at least one picture based on the decoded one or more syntax elements,
wherein the multi-hypothesis arithmetic coding includes a linear combination of a plurality of probability models,
wherein each probability model is derived using a corresponding probability update rate from the plurality of probability update rates, and
wherein the linear combination is a weighted sum using a plurality of weights, wherein each weight depends on the frame type of the at least one picture.

* * * * *